United States Patent
Chellamuthu et al.

(10) Patent No.: US 12,199,859 B2
(45) Date of Patent: Jan. 14, 2025

(54) DATA NETWORK DUPLICATE FLOW DETECTION IN HARDWARE WITH LINE RATE THROUGHPUT

(71) Applicant: Cisco Technology, Inc., San Jose, CA (US)

(72) Inventors: Ramamoorthi Chellamuthu, Milpitas, CA (US); Roshinil Paul, San Jose, CA (US); Dipak Kumar Neog, Pleasanton, CA (US); Suvidh Mathur, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 18/100,489

(22) Filed: Jan. 23, 2023

(65) Prior Publication Data

US 2024/0250902 A1 Jul. 25, 2024

(51) Int. Cl.
*H04L 45/00* (2022.01)
*H04L 12/46* (2006.01)
*H04L 45/42* (2022.01)

(52) U.S. Cl.
CPC .......... *H04L 45/38* (2013.01); *H04L 12/4641* (2013.01); *H04L 45/42* (2013.01)

(58) Field of Classification Search
CPC ............ G01R 31/318572; H04L 45/74; H04L 63/0236; H04L 63/1408; H04L 43/026; H04L 12/4641; H04L 45/38
See application file for complete search history.

(56) References Cited

U.S. PATENT DOCUMENTS

| | | | |
|---|---|---|---|
| 9,264,400 B1* | 2/2016 | Lin | H04L 49/30 |
| 9,660,879 B1* | 5/2017 | Rothstein | H04L 43/026 |
| 9,996,653 B1* | 6/2018 | Shen | H05K 1/0296 |
| 10,623,308 B2* | 4/2020 | Singh | H04L 69/22 |
| 11,765,488 B1* | 9/2023 | Sivaraj | H04Q 9/00 |
| | | | 340/2.1 |
| 2004/0243835 A1* | 12/2004 | Terzis | H04L 63/0263 |
| | | | 726/3 |
| 2013/0336164 A1* | 12/2013 | Yang | H04L 47/125 |
| | | | 370/255 |
| 2014/0328350 A1* | 11/2014 | Hao | H04L 45/74 |
| | | | 370/401 |

(Continued)

FOREIGN PATENT DOCUMENTS

WO WO-2019135249 A1 * 7/2019 ............... G06F 9/44

*Primary Examiner* — Hitesh Patel
*Assistant Examiner* — Sandarva Khanal
(74) *Attorney, Agent, or Firm* — Lee & Hayes, P.C.

(57) ABSTRACT

Techniques for detecting duplicate data flows. A data packet of a data flow is received by computer hardware the data packet having a first five tuple, an ingress interface and a VLAN tag. Data is sent to a central processing unit. The central processing unit installs policy tiles into a policy tile database of the computer hardware, the policy tiles including the first five tuple, the first ingress interface and the first VLAN tag. A second data packet is received and compared with the policy tiles in the policy tile database. If the second data packet has the same five tuple as the first data packet but has either a different ingress interface or a different VLAN tag, then the second data packet is determined to be a duplicate of the first data flow and is dropped.

19 Claims, 10 Drawing Sheets

(56) References Cited

U.S. PATENT DOCUMENTS

| | | | |
|---|---|---|---|
| 2014/0331274 A1* | 11/2014 | Bitton | H04L 63/0227 |
| | | | 726/1 |
| 2017/0171039 A1* | 6/2017 | Su | H04L 43/04 |
| 2018/0367541 A1 | 12/2018 | Ponnuswamy et al. | |
| 2019/0149437 A1 | 5/2019 | Hegde et al. | |
| 2019/0199609 A1* | 6/2019 | Hammerle | H04L 43/08 |
| 2019/0327156 A1 | 10/2019 | Hammerle et al. | |
| 2019/0379588 A1 | 12/2019 | Rao | |
| 2020/0067808 A1* | 2/2020 | Nandy | H04L 43/0811 |
| 2020/0145315 A1* | 5/2020 | Levy | H04L 69/324 |
| 2020/0249874 A1* | 8/2020 | Foo | G06F 16/182 |
| 2020/0304415 A1* | 9/2020 | Zaifman | H04L 43/20 |
| 2020/0336436 A1* | 10/2020 | Baldi | H04L 47/32 |
| 2022/0360506 A1* | 11/2022 | Labonte | H04L 43/062 |

* cited by examiner

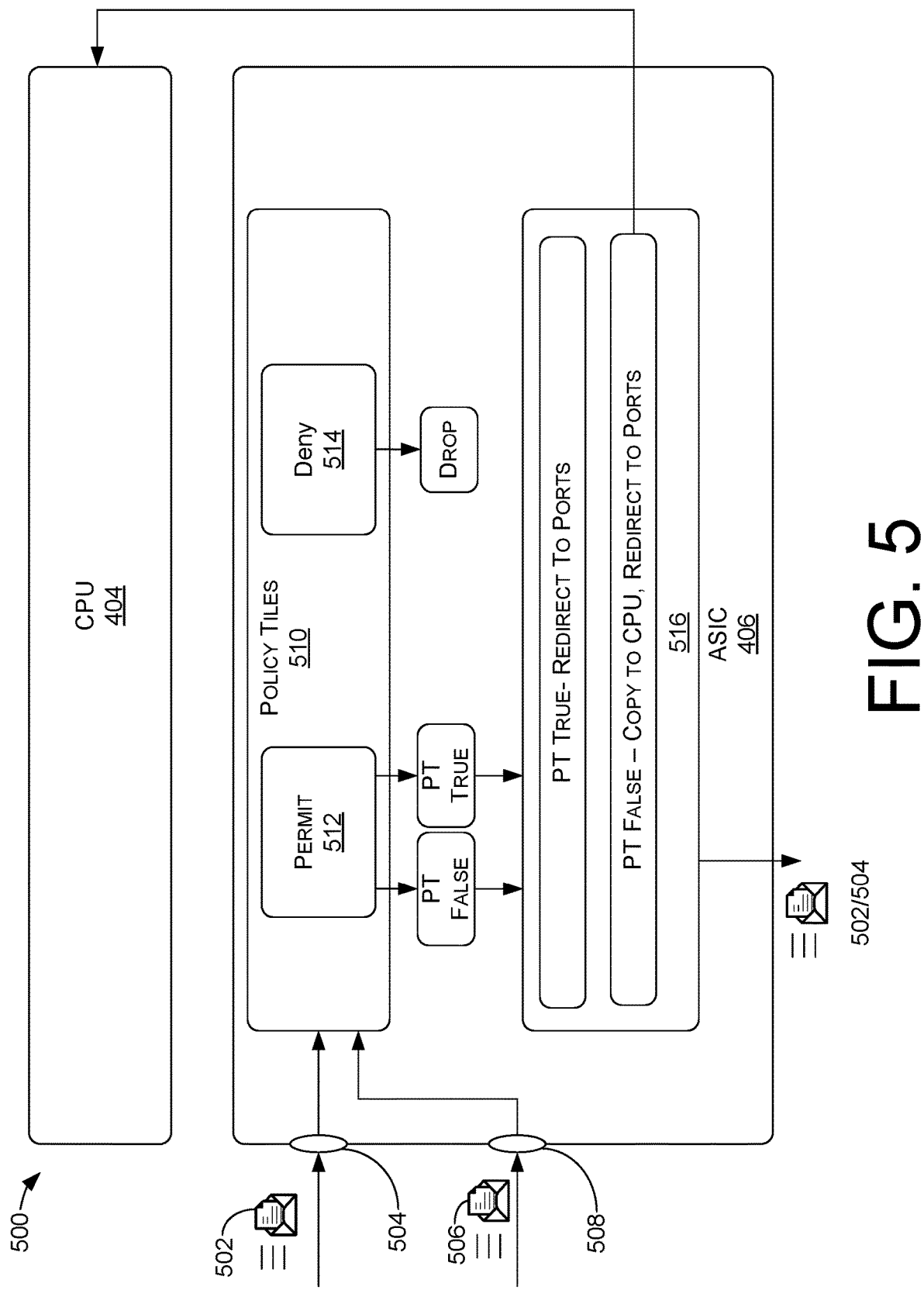

DATA NETWORK DUPLICATE FLOW DETECTION IN HARDWARE WITH LINE RATE THROUGHPUT

TECHNICAL FIELD

The present disclosure relates generally to the detection of duplicate data flow in a data broker system connected with a computer network.

BACKGROUND

Vast amounts of data are constantly transmitted over computer networks. Computer networks can include a network of switches and/or routers connected with computer devices such as computer servers, routers wireless devices, Internet of Things (IOT) devices, etc. Many types of network architectures exist for transmitting this data. A wide area network can include, for example, the internet. In some cases, organization or enterprises can manage a Local Area Network (LAN) which in some cases can be a locally managed data center. Virtual Large Are Networks (VLANs) are also available as architectures for data centers and can provide increased flexibility in meeting an organizations networking needs.

Production data traffic in a LAN or VLAN such as a data center can be managed by a data broker network aided by various data analytics tools. The data broker network can receive information about network data flow from a production network and can route that data information to one or more analytics tools which can provide useful information to a database management or controller in order to maximize performance of the data center network and adapt the network to changing organizational needs.

Current production traffic in a data center spine-leaf or CLOS topology can be sent to such a traffic broker switch or network via a Test Access Point (TAP) in the production network. A TAP could be, for example, a Switch Port Analyzer (SPAN) TAP, an optical TAP, etc. This data flow information can then be redirected to the data analytics tools for analysis to provide useful information to a data center manager.

Since traffic may be copied to the network data broker switch or switches from multiple points in the production network, it may end up providing duplicate data flow information in the network data broker switch or switches. These duplicate traffic or data flows can overwhelm the traffic analyzer tools. This can reduce the performance and integrity of the data analytics provided to the data center manager.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5. Illustrates a schematic of deduplication logic and circuitry according to an embodiment.

DESCRIPTION OF EXAMPLE EMBODIMENTS

Overview

Figure 1:
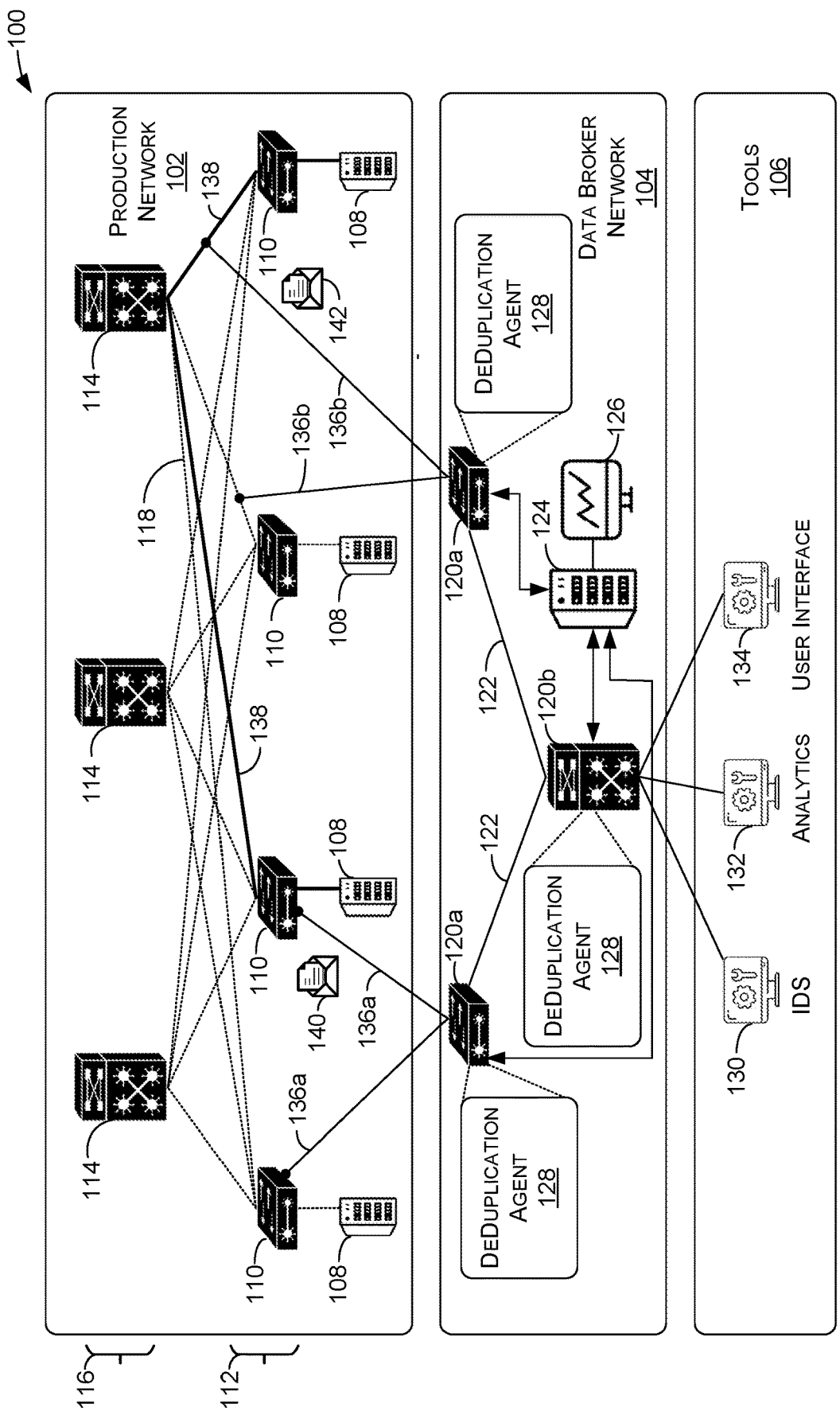
FIG. 1 illustrates a schematic illustration of a production computer network connected with a data broker network and analytics tools.

This disclosure describes techniques for detecting duplicate data in a data flow broker network. A first data packet is received by a network device such as a network switch, the packet having a first five tuple, a first ingress interface and a first Virtual Local Area Network (VLAN) tag. An entry is installed into a hardware-based policy tile database, which includes the first five tuple, the first ingress interface and the first VLAN tag. A second data packet is received by the network device, the second data packet having a second five tuple, a second ingress interface and a second VLAN tag. A comparison is made between: the first five tuple and the second five tuple; the first ingress interface and the second ingress interface; and the first VLAN tag and the second VLAN tag. If: the first five tuple matches the second five tuple, the first ingress interface matches the second ingress interface; and the first VLAN tag matches the second VLAN tag, then the first and second data packets are determined to be part of the same data flow and the data packet is forwarded to a data flow analyzer. On the other hand, if the first five tuple matches the second five tuple, but either (1) the first ingress interface does not match the second ingress interface, or (2) the first VLAN tag does not match the second VLAN tag, the data packet is determined to be a duplicate flow and is dropped.

Additionally, the techniques described herein may be performed by a system and/or device having non-transitory computer-readable media storing computer-executable instructions that, when executed by one or more processors, performs the method described above.

Example Embodiments

A data center is home to the computational power, storage, and applications necessary to support an enterprise or business. The data center infrastructure is central to the Information Technology (IT) architecture, from which all content is sourced or passes through. Proper planning of the data center infrastructure is important, and performance, resiliency, and scalability should be carefully considered.

An important aspect of data center design is flexibility in quickly deploying and supporting new services. Designing a flexible architecture that has the ability to support new applications in a short time frame can result in a significant competitive advantage for an enterprise. Such design requires solid initial planning and thoughtful consideration in the areas of port density, access layer uplink bandwidth, true server capacity, and oversubscription, to name just a few. The data center network design can, in some instances, be based on a layered approach, which has been tested and improved over the past several years in some of the largest data center implementations in the world. The layered approach is a basic foundation of data center design that seeks to improve scalability, performance, flexibility, resiliency, and maintenance.

In some instances, the layers of a data center design can be the (1) core, (2) aggregation, and (3) access layers. The core layer provides the high-speed packet switching backplane for all flows going in and out of the data center. The core layer provides connectivity to multiple aggregation modules and provides a resilient layer 3 routed fabric with no single point of failure. The core layer runs an interior routing protocol, such as Open Shortest Path First (OSPF) or Enhanced Interior Gateway Routing Protocol (EIGRP), and load balances traffic between the campus core and aggregation layers.

Aggregation layer modules provide important functions such as service module integration, layer 2 domain definitions, spanning tree processing, and default gateway redundancy. Server-to-server multi-tier traffic flows through the aggregation layer and can use services such as firewall and server load balancing to represent the integrated service modules. These modules provide services, such as content switching, firewall, Secure Socket Layer (SSL) offload, intrusion detection, network analysis, and more.

The access layer is where the servers physically connect with the network. The server components can include 1RU servers, blade servers with integral switches, blade servers with pass-through cabling, clustered servers, and mainframe servers with Open System Adapters (OSA). The access layer network infrastructure can include modular switches, fixed configuration or 2RU switches, and integral blade server switches. Switches provide both Layer 2 and Layer 3 topologies, fulfilling the various server broadcast domain or administrative requirements.

One design model is the multi-tier model. The multi-tier model is one of the most common designs in an enterprise. It is based on the web, application, and database layered design supporting commerce and enterprise business ERP and CRM solutions. This type of design supports many web service architectures. These web service application environments can be used by ERP and CRM solutions. The multi-tier model relies on security and application optimization services to be provided in the network.

Another design model is the server cluster model. The server cluster model has grown out of the university and scientific community to emerge across enterprise business ventures including financial, manufacturing and entertainment. The server cluster model is most commonly associated with high-performance computing (HPC), parallel computing, and high-throughput computing (HTC) environments, but can also be associated with grid/utility computing. These designs are typically based on customized, and sometimes proprietary, application architectures that are built to serve particular business objectives.

Multi-Tier Model:

The multi-tier data center model is dominated by HTTP-based applications in a multi-tier approach. The multi-tier approach includes web, application, and database tiers of servers. Currently, most web-based applications are built as multi-tier applications. The multi-tier model uses software that runs as separate processes on the same machine using inter-process communication (IPC), or on different machines with communications over the network. Typically, the following three tiers are used: (1) web-server; (2) application; and (3) database.

Multi-tier server farms built with processes running on separate machines can provide improved resiliency and security. Resiliency is improved because a server can be taken out of service while the same function is still provided by another server belonging to the same application tier. Security is improved because an attacker can compromise a web server without gaining access to the application or database servers. Web and application servers can coexist on a common physical server. The database typically remains separate.

Resiliency is achieved by load balancing the network traffic between the tiers, and the security is achieved by placing firewalls between the tiers. Segregation can be achieved between the tiers by deploying a separate infrastructure composed of aggregation and access switches, or by using VLANs.

In a multi-tier data center model, physical segregation improves performance, because each tier of servers is connected to dedicated hardware. The advantage of using logical segregation with VLANs is the reduced complexity of the server farm. The choice of physical segregation or logical segregation depends on specific network performance requirement and traffic patterns.

Server Cluster Model:

In a modern data center environment, clusters of servers can be used for many purposes, including high availability, load balancing, and increased computational power. All clusters have the common goal of combining multiple CPUs to appear as a unified high-performance system using special software and high-speed network interconnects. Server clusters have historically been associated with university research, scientific laboratories, and military research for unique applications such as meteorology, seismology, or military research. Server clusters are being used in more enterprises, because the benefits of clustering technology are being applied to a broader range of applications, such as financial trending analysis, film animation, manufacturing, and search engines. In the enterprise, developers are increasingly requesting higher bandwidth and lower latency for a growing number of applications. The time-to-market implications related to these applications can result in a tremendous competitive advantage. For example, the cluster performance can directly affect getting a film to market for the holiday season or providing financial management customers with historical trending information during a market shift.

Data Broker Network:

Visibility into application traffic has been important for infrastructure operations to maintain security, troubleshooting, and compliance and to perform resource planning. With the technological advances and growth in cloud-based applications, it has become more important to gain increased visibility into the network traffic. Traditional approaches to gain visibility into network traffic are expensive and rigid, making it difficult for managers of large-scale deployments.

A network broker can provide a software-defined, programmable solution to aggregate copies of network traffic using Switched Port Analyzers (SPAN) or network Test Access Point (TAP) for monitoring and visibility. As opposed to traditional network TAPS and monitoring solutions, this packet-brokering approach can offer a simple, scalable, and cost-effective solution that is well-suited for customers who need to monitor higher-volume and business-critical traffic for efficient use of security, compliance, and application performance monitoring tools.

The flexibility to use a variety of network switches and the ability to interconnect them to form a scalable topology provides the ability to aggregate traffic from multiple input TAP or SPAN ports and replicate and forward traffic to multiple monitoring tools which may be connected across different switches.

However, because network flow data can be received from multiple input TAP or SPAN ports, it is possible for a data broker network to receive duplicate data flow information. This duplicate data flow information can overwhelm data analytics tools used to manage and optimize the performance and reliability of the production data network (e.g. data center).

This disclosure describes techniques for deduplicating data flow in a data broker network so that data analytics tools are not overwhelmed by such duplicate data flow, thereby improving performance and usefulness of the data analytics tools.

A data packet representative of a data flow is received from a production computer network. The data packet can be received by a switch of a data broker network. The receiving switch of the data broker network includes logic and/or circuitry that provides a deduplication agent that is configured to recognize that a data flow is a duplicate data packet of a data flow; such as a duplicate data flow that has been received from multiple locations within the production computer network. In one embodiment, the deduplication agent can utilize both hardware-based logic such as an Application Specific Integrated Circuit (ASIC) and software logic such as associated with a Central Processing Unit (CPU).

The data packet representing a data flow from the production data network is received by hardware such as ASIC hardware of the deduplication agent of the computer network switch of the data broker network. The ASIC hardware checks a policy tile database to compare information of the received data packet with existing entries of the policy tile table. The received data packet includes information including: a five tuple; an ingress interface; and a VLAN tag. If the policy tile table does not include an entry having a five tuple that matches the five tuple of the received data packet, then the data packet information is forwarded to a CPU which can install an entry into the policy tile table.

If upon comparing the received data packet information with the policy tile table it is determined that the policy tile table includes an entry that has a five tuple matching the received data packet, then the data packet is compared with that policy tile. If the data packet has an ingress interface that matches the ingress interface of the policy tile and also has a VLAN tag that matches a VLAN tag of the policy tile table, then the data packet can be determined to be a new data packet of a previously established data flow, and the data packet is forwarded to data analytics tooling.

One the other hand, if the received data packet has a five tuple that matches a five tuple of a policy tile, but either the ingress interface of the data packet does not match an ingress interface of the policy tile or a VLAN tag of the received data packet does not match a VLAN tag of the policy tile, then the data packet is determined to be a duplicate data flow, and the data packet is dropped in order to avoid overwhelming the data analytics tooling.

In one embodiment, the hardware-based policy tile database is stored in Application Specific Integrated Circuit (ASIC) computer hardware. In one embodiment, the first and second data packets are initially received by the ASIC computer hardware. Processing the incoming data packet in ASIC hardware with policy tiles also stored in ASIC hardware advantageously allows for fast, line rate deduplication of received production data flow information.

In one embodiment, the first data packet is received by computer hardware such as an Application Specific Integrated Circuit, and data regarding the first data packet is sent to a Central Processing Unit (CPU) where the information is processed to learn flow information regarding the first data packet. The CPU then generates one or more entries which are installed into the policy tile data base which is stored in the ASIC hardware. In one embodiment, the policy tile database can be reset after one or more iterations of determining whether to reroute a data packet to the flow analyzer or whether to drop the data packet.

In one embodiment, if the second ingress interface does not match first ingress interface, the packet is determined to be a duplicate flow and is dropped from the ASIC. Additionally, the techniques described herein may be performed by a system and/or device having non-transitory computer-readable media storing computer-executable instructions that, when executed by one or more processors, performs the method described above.

FIG. 1 illustrates a schematic representation of a computer network architecture 100 that includes a production network 102, a data broker network 104 and network, and data flow analytics tools 106. In one embodiment, the production network 102 can have a spine/leaf configuration. This can include various computer devices 108. The computer devices can be computer devices such as computer servers or could be any number of other computer devices such as personal computers, laptop computers telecommunication devices such as cell phones or Voice Over Internet Phones (VOIP), Internet of Things (IOT) devices as well as others. The devices can be connected with various switches or routers 110, which in one embodiment can define a leaf layer 112. The switches 110 of the leaf layer 112 can be connected with various switches 114 which in one embodiment can make up a spine layer 116 of the production network 102. The various switches 110, 114 of the production network 102 can be connected by various lines 118, shown in dotted line in FIG. 1. The lines 118 of the connection network 102 can be of various forms such as electrical lines, fiberoptic lines, etc.

The data broker network 104 can include a plurality of data broker network switches 120. The switches 120 can be connected with one another by lines 122, which can be electrical lines, fiberoptic lines etc. In one embodiment, one or more of the data broker network switches can be in communication with or connected with a data broker controller 124 which, in one embodiment can be connected with a user interface 126 which may include a device such as a computer monitor, keyboard, etc. to allow a user to manage the data broker network 104. In one embodiment, one or more, or all of the switches 120 can include a deduplication agent 128, which can include computer hardware and analytics for recognizing and handling duplicate data flows as will be described in greater detail herein below.

One or more of the data broker network switches 120 can be connected with, or in communication with, data flow analytics 106 tools. In one embodiment, the data flow analytics tools 106 can include an Intrusion Detection System (IDS) 130, which can include logic and analytics for detecting a security vulnerability in the production network 102 and for protecting against such potential vulnerability. The tools 106 can also include analytics 132 which can include logic and circuitry for monitoring various performance parameters of the production network 102. Such performance parameters can include, but are not limited to, latency, data loss, bandwidth, data rate, jitter, data loss, etc. The tools 106 can also include user interface tools 134 such as a video monitor or other user interface tool, which in one embodiment can provide real time analysis of video streaming for the production network 102.

With continued reference to FIG. 1, one or more of the data broker switches 120) can be connected with one or more points in the production data network 102 in order to retrieve and manage data flow through the production network 102. This can be achieved by a Test Access Point (TAP) 136. A TAP is a hardware device that is placed on a network segment, allowing the data broker network 104 to access and monitor traffic through the production network. The network TAP 136 allows data traffic to flow through the production network 102 without interruption or interference. The TAP can create a copy of both sides of the traffic on the production network 102. The TAP 136 can be a passive TAP, active TAP or virtual tap. The TAP 136 can also be a Switch Port Analyzer (SPAN) TAP 136a or can be an optical TAP 136b. A SPAN TAP 136a is a dedicated port on a switch that makes a mirrored copy of network traffic from within the switch (e.g. switch 110, 114) wherein the mirrored copy is can be sent to the data broker network 104. An optical TAP 136 is an access point installed in the network 102 that provides real-time monitoring of ports. In some embodiments, the optical TAP can be a passive device that integrates TAP functionality into a cable patching system, which requires no power of its own and does not actively interact with other components of the network 102. Instead of two switches or routers connecting directly to each other, the optical TAP sits between the two endpoint devices connected directly to each of them as shown in FIG. 1 with regard to optical taps 136b.

One challenge that can arise with the use of TAPs 136, is that they can pick up traffic from various locations within the network. This can lead to duplicate data flows being sent to the data broker network 104 and then to the data flow analytics tools 106. This duplicate traffic can overwhelm the data flow analytics tools resulting in poor performance of the data monitoring, slower response time or even failure of the data flow analytics tools 106. For example, as shown in FIG. 1, solid line 138 indicates a data flow from one computer device 108 to another computer device 108. As can be seen, there are multiple TAPS 136a, 136b picking up data flow from multiple locations along the data route 138. This can lead to duplicate data flows being sent to the data flow analytics tools 106. The embodiments illustrated below provide a solution to this challenge that allow the duplicate data flow to be detected and, in some instances, be removed or dropped, thereby preventing the data flow analytics tools 106 from being overwhelmed. In one embodiment, as shown in FIG. 1, one or more or all of the network switches 120 of the data broker network can be provided with a deduplication agent 128 as described above which can detect and remove the duplicate date flow information as will be described herein below. In the embodiment shown in FIG. 1, the multiple data flow can be received as data packets 140, 142, which can be received from different locations along the route 138. It can be seen that these data packets arrive on different switches 120a and then are sent to switch 120b. It can be appreciated, then, that the data packets 140, 142 can be received on different ingress ports on the data broker network switch 120b. This can be used to recognize that the data packets 140, 142 are duplicate flows in a manner that will be described in greater detail herein below.

The data packets 140, 142 can have the same five-tuple, indicating that they are duplicate flows arriving on different ingress interfaces. A five-tuple is a set of five different values that comprise a Transmission Control Protocol/Internet Protocol (TCP/IP) connection. The five-tuple can include a source IP address/port number, destination IP address/port number and a protocol in use. System and network administrators (NA) can use five tuples to identify key requirements for creating a secure, operational and bidirectional network connection between two or more remote and local devices. The source and destination addresses are primary five-tuple components. The source address is the IP address of the network that creates and sends the data packet, and the destination address is the recipient.

Figure 2:
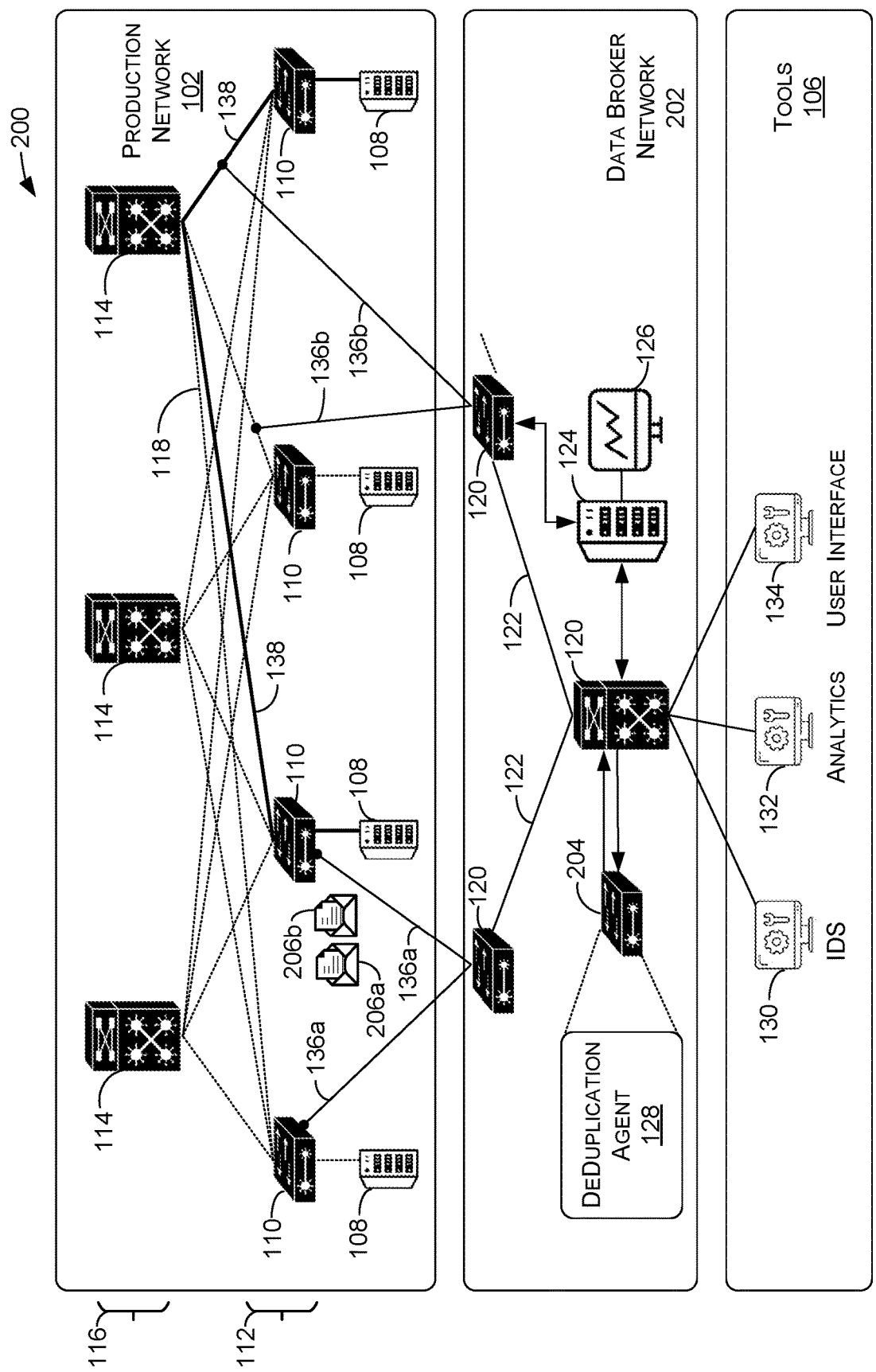
FIG. 2 illustrates a schematic of a production computer network connected with a data broker network and analytics tools according to another embodiment.

FIG. 2 is a schematic representation illustrating a network architecture 200 according to an alternate embodiment. The architecture 200 can be similar to the architecture 100 described above with reference to FIG. 1. The network architecture 200 can include a production data network 102, a data broker network 202, and data flow analytics tools 106. In the embodiment illustrated in FIG. 2, one or more of the data broker network switches 120 can be connected with a deduplication switch 204. The deduplication switch can include a deduplication agent 128 that can include computer hardware and logic that can function to detect duplicate data packets and remove or drop those duplicate data packets. This will be described in greater detail herein below:

In the implementation shown in FIG. 2, multiple data packets 206a, 206b can be received on from the same link of the production data network 102. In this case, each of the packets can have a different Virtual Large Area Network (VLAN) tag, while still having the same five-tuple, thereby indicating that the data packets 206a, 206b are actually duplicate data packets of the same data flow. The deduplication network switch 204 can detect these duplicate data packets as being duplicates of the same flow and can delete or drop them as desired.

Figure 3:
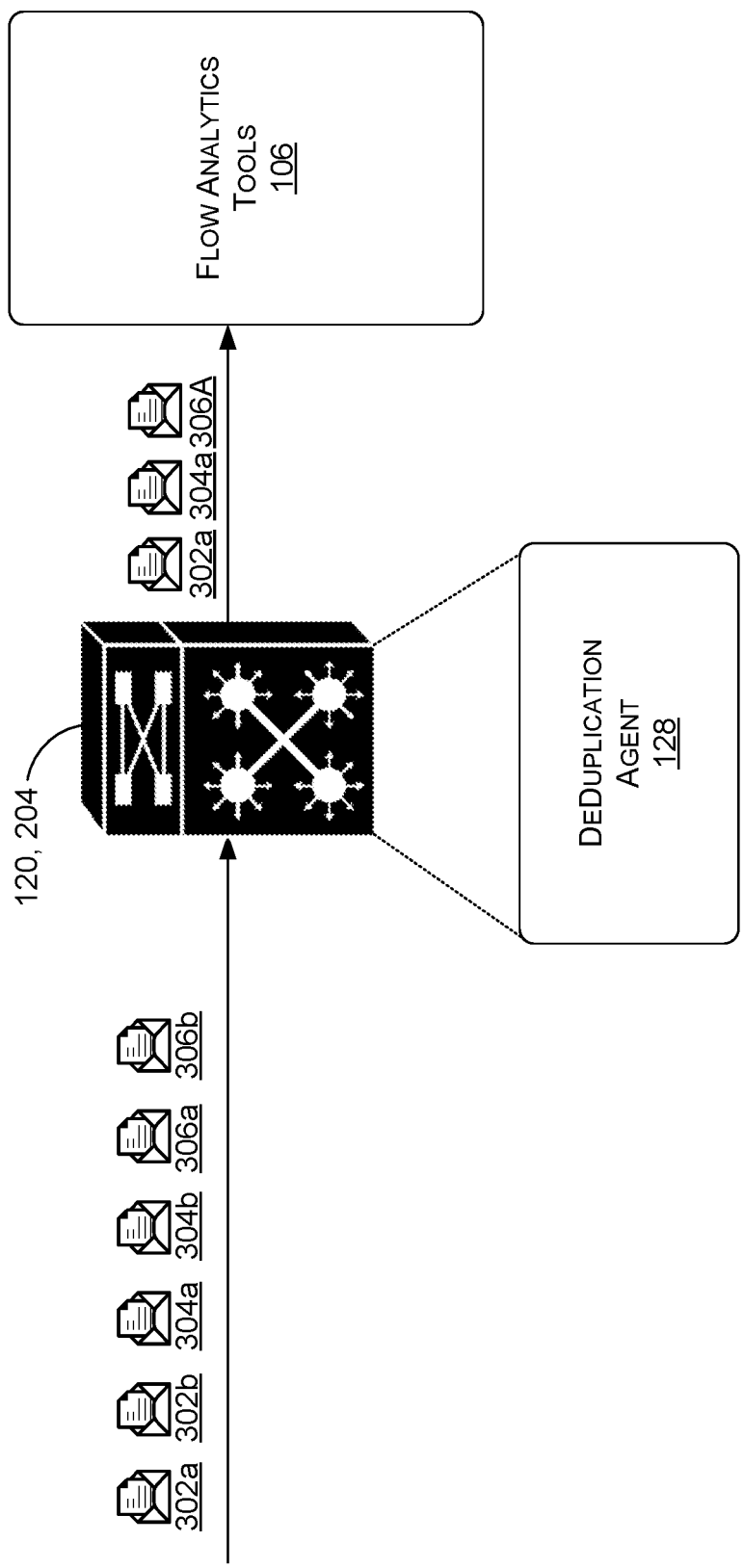
FIG. 3 illustrates a schematic of a network data broker switch including a deduplication agent for limiting duplicate data flow sent to data analytics tools.

FIG. 3 is a schematic illustration of a flow of data packets as managed by a deduplication agent 128 of a broker network switch 120, or 204. As shown in FIG. 3, multiple data packets 302, 304, 306 can enter the switch 120, 204. These can include, for example, a data packet 302a of a first data flow and duplicate data packet 302b of the same data flow. Similarly, data packet 304a can be a first data packet of a second data flow and data packet 304b can be a duplicate data packet the second data flow, and data packet 306a can be a first data packet of a third data flow and data packet 306b can be a duplicate data packet of the third data flow.

The deduplication agent 128 detects the duplicate data packets 302b, 304b, 306b and drops them so that only the first data packets 302a, 304a, 306a are sent to the flow analytics tools 106. In one embodiment, the deduplication agent 128 can be the deduplication agents 128 of the switches 120 of FIG. 1. In another embodiment, the deduplication agent 128 can be deduplication logic and circuitry 129 incorporated into deduplication switch 204 of FIG. 2.

Figure 4:
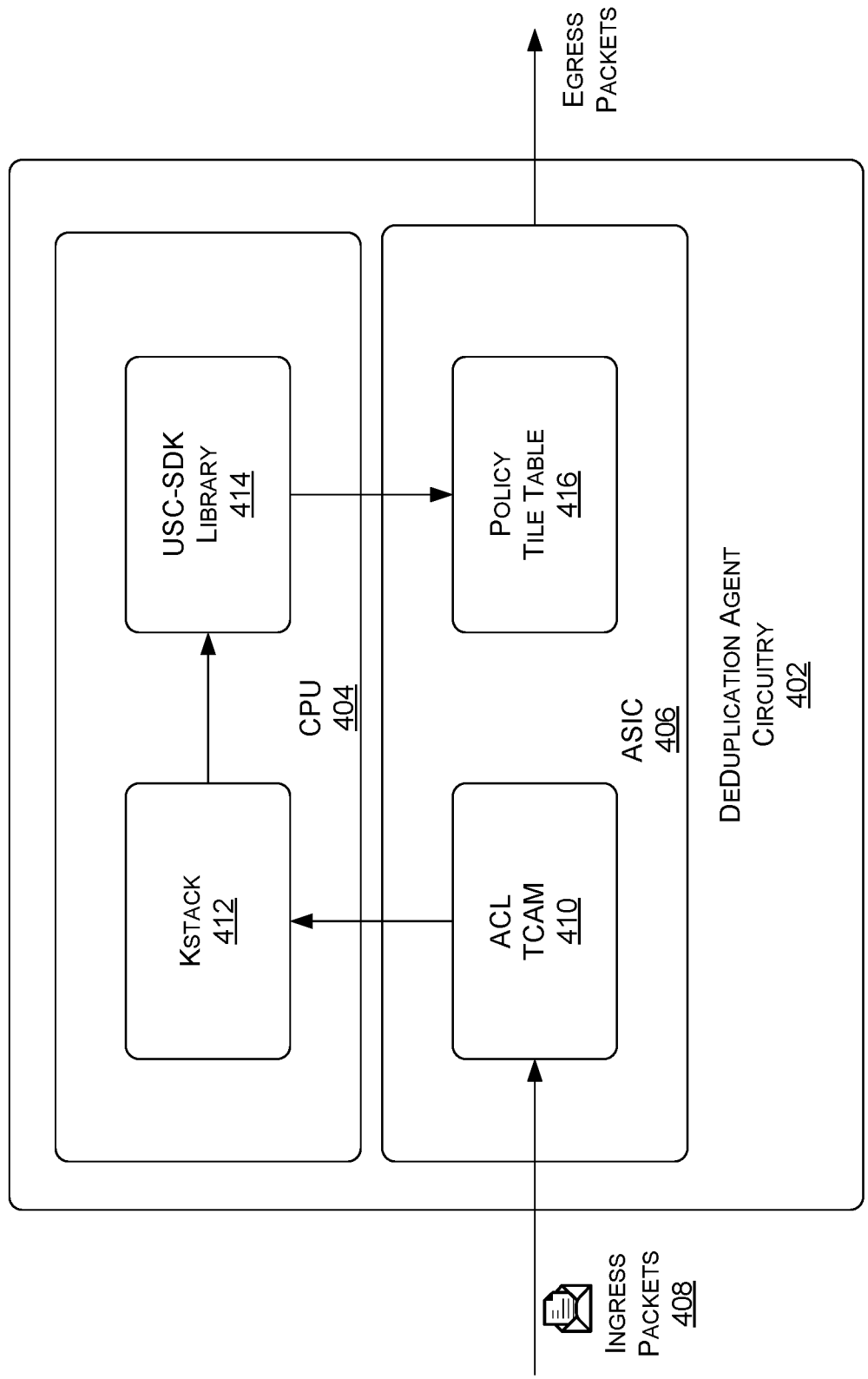
FIG. 4 illustrates is a schematic of circuitry according to an embodiment, which can be incorporated into a deduplication agent of a network data broker switch for limiting duplicate data flow.

FIG. 4 is a schematic illustration of circuitry 402 which can be incorporated into a deduplication agent of a switch, such as switch 120, and may correspond to deduplication agent 128 of FIGS. 1-3. The circuitry 402 can include a Central Processing Unit (CPU) 404, and computer hardware 406, which in one embodiment can be an Application Specific Integrated Circuit (ASIC), and which will be referred to as such herein for purposes of simplicity. Ingress data packets 408 can be received into the ASIC 406. The data packet 408 can be received and processed by Ternary Processable Content Memory (TCAM) according to Access Control List (ACL) rules (ACL/TCAM 410). TCAM is a special type of memory used in network switches to achieve high speed packet forwarding and classification packet forwarding by referring to the rules written in the routing table whereas packet classification is performed by referring to the rules in the ACL.

Information and data regarding the data packet 408 can be sent from the ACL/TCAM 410 to a Kernel Stack (KStack) 412 of the CPU 404. The KStack 412 uses software to manage the routes and front panel ports of the router 120 (FIG. 1). Information and data regarding the data packet 408 can be sent from the KStack 412 to a User Service Center-Software Development Kit Library (USD-SDK Library 414). The CPU can install an entry into a policy tile table 416 in the ASIC hardware 406. The policy tile table 416 includes policies for handling incoming data packets based on stored information regarding previously received data packets which have been learned by the CPU and installed as policy tiles in the policy tile database 416. For example, the policy tile table 416 can be utilized to determine whether an incoming data packet is a duplicate data flow and should be dropped, or whether it should be rerouted to data flow analytics tools as an egress packet 418, and also whether information regarding a new incoming data packet should be forwarded back to the CPU where information regarding a new data flow can be learned by the CPU and installed into the policy tile database 416 as one or more new entries. This process will be described in greater detail herein below.

FIG. 5 is a schematic illustration of deduplication logic and circuitry 500 according to an embodiment. The logic and circuitry 500 include the previously described Application Specific Integrated Circuit (ASIC) 406 and the previously described Central Processing Unit CPU 404. The ASIC 406 can receive data flow packets from multiple ports 504, 508. As shown in FIG. 5, the ASIC 406 can receive a data packet 502 through a first ethernet port 504. A second data packet 506 can received through a second ethernet port 508. Each of the data packets 502, 506 has an associated (1) five-tuple. (2) ingress interface, and (VLAN tag). The five-tuple defines the data flow of the data packet 502, 506. The five tuple is a code that defines: (1) source IP address; (2) destination IP address; L4 source port; destination port; and IP protocol. If the five tuple of one data packet is the same as the five tuple of another data packet then they are from the same data flow. In FIG. 5, the ingress interface can be either of the first ethernet port 504 or the second ethernet port 508.

The information/data regarding the data packet 502, 504 is sent compared with policy tiles of a policy tile database 510. The information/data regarding the data packet 502, 504 can include the above described five tuple, ingress interface, and VLAN tag. Based on the comparison with the policy tile database 510, a decision can be made to permit the data packet 512 or deny the data packet 514. If no policy tile exists for the data packet information/data then the data packet (PT false), then the data packet is from a new flow. The data packet is forwarded to the next node and the information regarding the data packet is forwarded to the CPU as indicated by logic box 516. The information regarding the data packet is forwarded to the CPU 404 so that the CPU can generate a new policy tile entry for that data flow, which can be stored in the policy tile database 510 of the ASIC hardware 406.

If a policy tile exists in the policy tile database (PT True), then a determination can be made whether to permit or drop the data packet. If the five tuple, ingress interface, and VLAN tag of the data packet matches a five tuple, ingress interface and VLAN tag of a policy tile then the data packet then a Permit decision 512 is made. The data packet is forwarded, and the data packet information is not forwarded to the CPU (decision box 516) since a policy tile already exists for that flow. If the five tuple of the data packet matches a five tuple of a policy tile, but either the ingress interface or the VLAN tag of the data packet does not match the ingress interface or VLAN tag of the policy tile, then decision to deny the data packet is made 514 and the data packet is dropped as being determined to be a duplicate data flow. Because the decision of whether to permit or drop the data packet is performed in the ASIC hardware 406, the forwarding and/or dropping of data packets can be performed much faster than would be possible using the CPU 404.

Figure 6A:
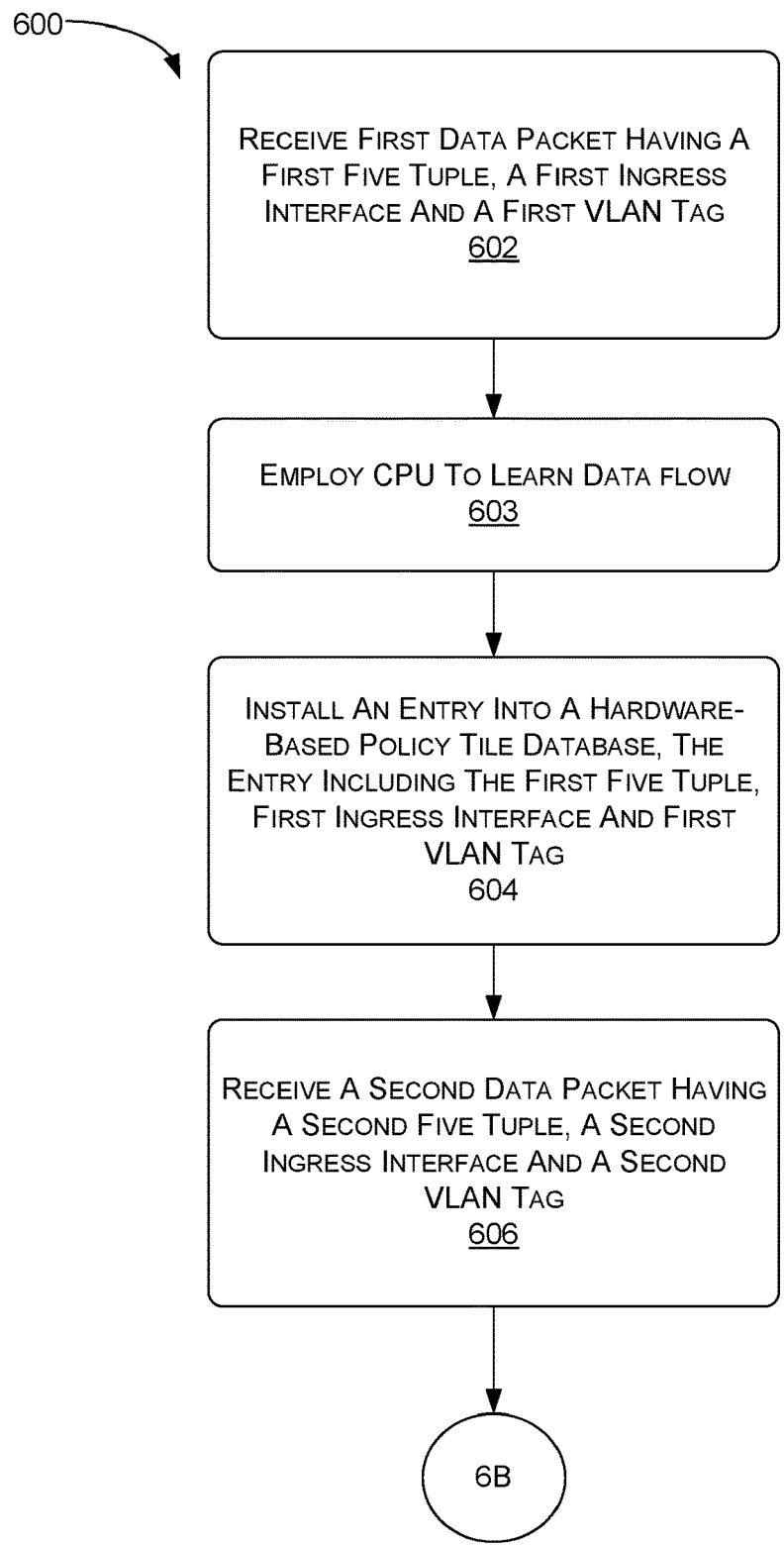
FIGS. 6A-6C show a flow chart illustrating a method for deduplicating data flow in a data broker network.
Figure 6B:
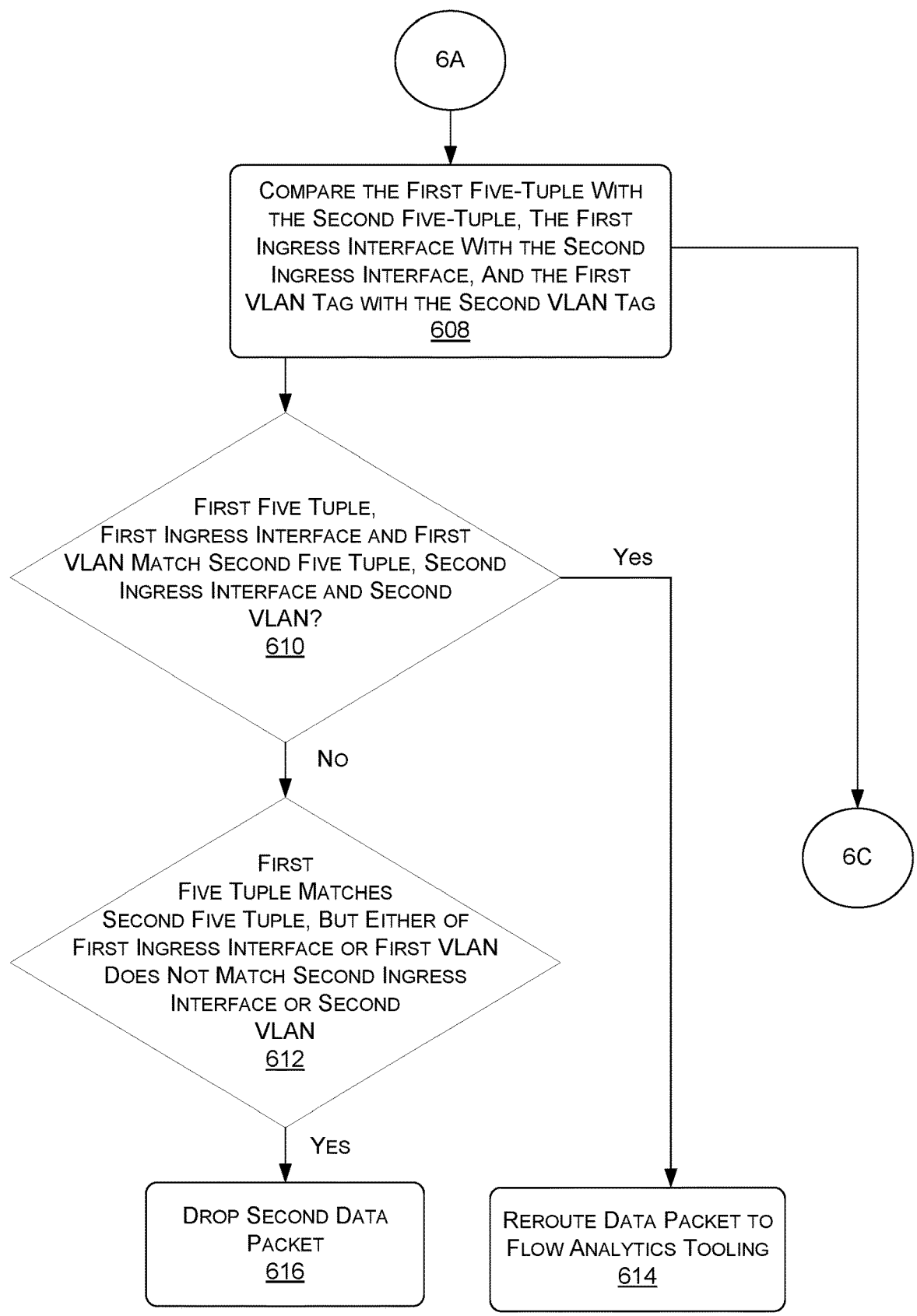
Figure 6C:
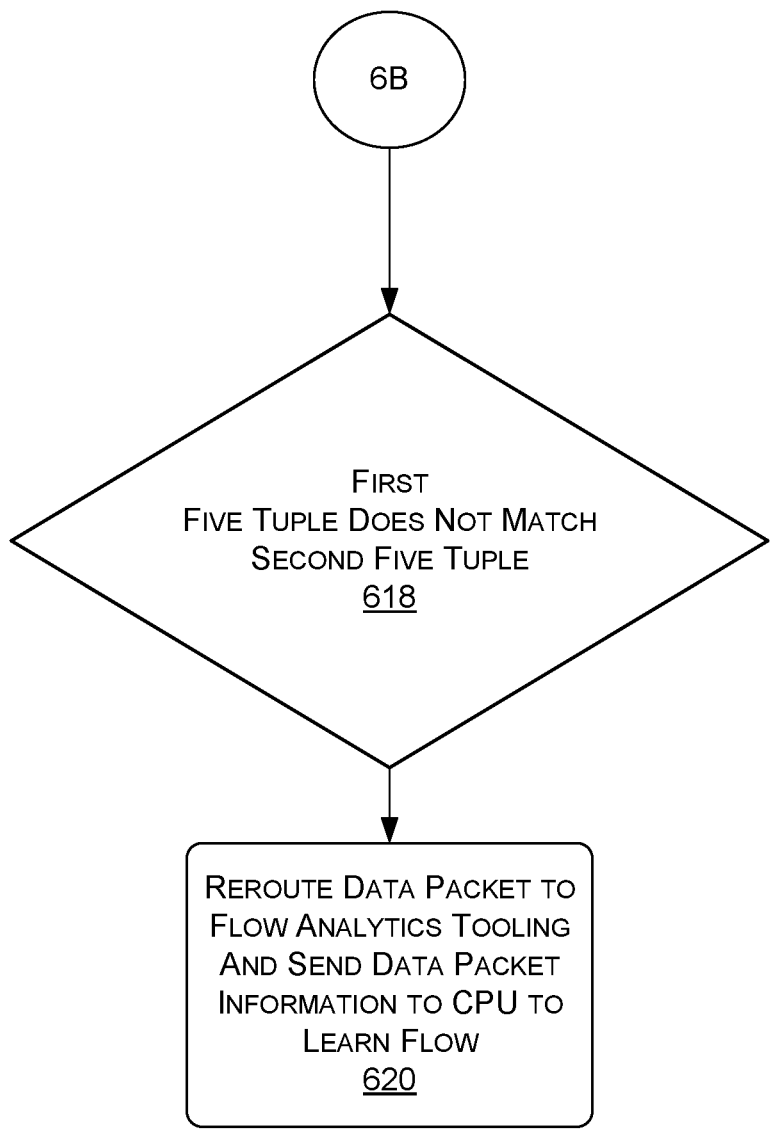

FIGS. 6A-6C illustrate flow diagrams of example an method 600 that illustrate aspects of the functions performed at least partly by the devices described in FIGS. 1-5. The logical operations described herein with respect to FIGS. 6A and 6B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A and 6B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 6A-6C are flow diagrams illustrating a method 600 for performing deduplication of data flow in a data network. A first data packet is received having a first five tuple, a first ingress interface and a first VLN tag 602. The first data packet can be received by a network switch of a data traffic broker network and can be received from a production network. The data packet can be received by the network switch of the data traffic broker from a Test Access Point (TAP). The TAP can be a Switch Port Analyzer (SPAN) TAP or can be an optical TAP, or some other type of TAP.

The Central Processing Unit (CPU) is employed to learn the data flow from the received data packet 603. The CUP installs an entry into a hardware-based policy tile database, wherein the entry includes the first five tuple, first ingress interface and first VLAN tag 604. In one embodiment, the entry can be made by a central processing unit (CPU), and installed the policy tile database which resides in the ASIC.

A second data packet is received having a second five tuple, a second ingress interface and a second VLAN tag 606. As with the previously described first data packet, the second data packet can be received by a network switch of a traffic broker network and can be received from a production network. The second data packet can be received from a Test Access Point (TAP) of the production network. The TAP can be a Switch Port Analyzer (SPAN) TAP, an optical TAP or some other type of TAP.

A comparison is made between the first five tuple and the second five tuple, the first ingress interface and the second interface and the first VLAN tag and the second VLAN tag 608. The comparison can be made using computer hardware such as Application Specific Integrated Circuit (ASIC) hardware and can be made by comparing the information regarding the second data packet with the policy tile previously installed in the policy tile database.

In a first determination operation 610, a determination is made as to whether the first five tuple, first ingress interface and first VLAN match the second five tuple 610. If the answer is yes, then the data packet is rerouted 614 to flow analytics tooling. This first determination can advantageously be performed at computer hardware level such as using Application Specific Hardware (ASIC) rather than at CPU level, allowing the determination to be made much more quickly than would be the case if the determination were made at software level such as by implementing the CPU.

If the answer to the determination of whether the first five tuple, first ingress interface, and the first VLAN match the second five tuple, second ingress interface, and the second VLAN is no (they don't all match), then a second determination operation 612 is made. In the second determination operation, a determination is made as to whether the first and second five tuples match one another, but either the first and second ingress interfaces do not match one another or the first and second VLANs do not match one another. Again, this determination can be made using computer hardware such as ASIC hardware, thereby increasing the speed witch which this determination can be performed. If the answer to this second determination operation is yes, then the data packet is determined to be a duplicate flow data packet and the data packet is dropped. Therefore, the second data packet is not a duplicate data flow. If a determination is made that the first five tuple does not match the second five tuple 618, then the data packet is a new data packet. In that case, the data packet is rerouted to flow analytics tooling and the data packet information is sent to the CPU to learn the new data flow 620.

Figure 7:
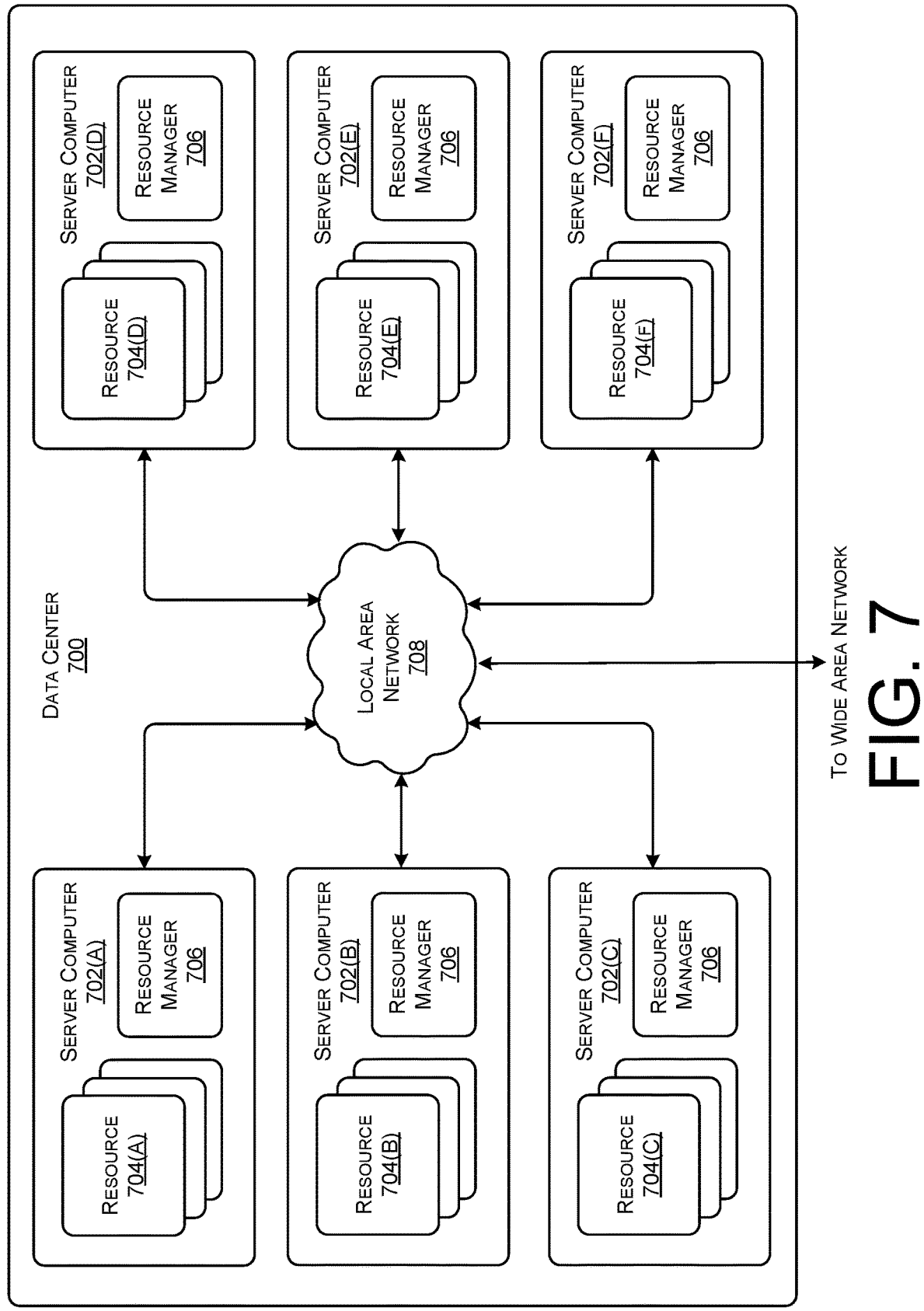
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
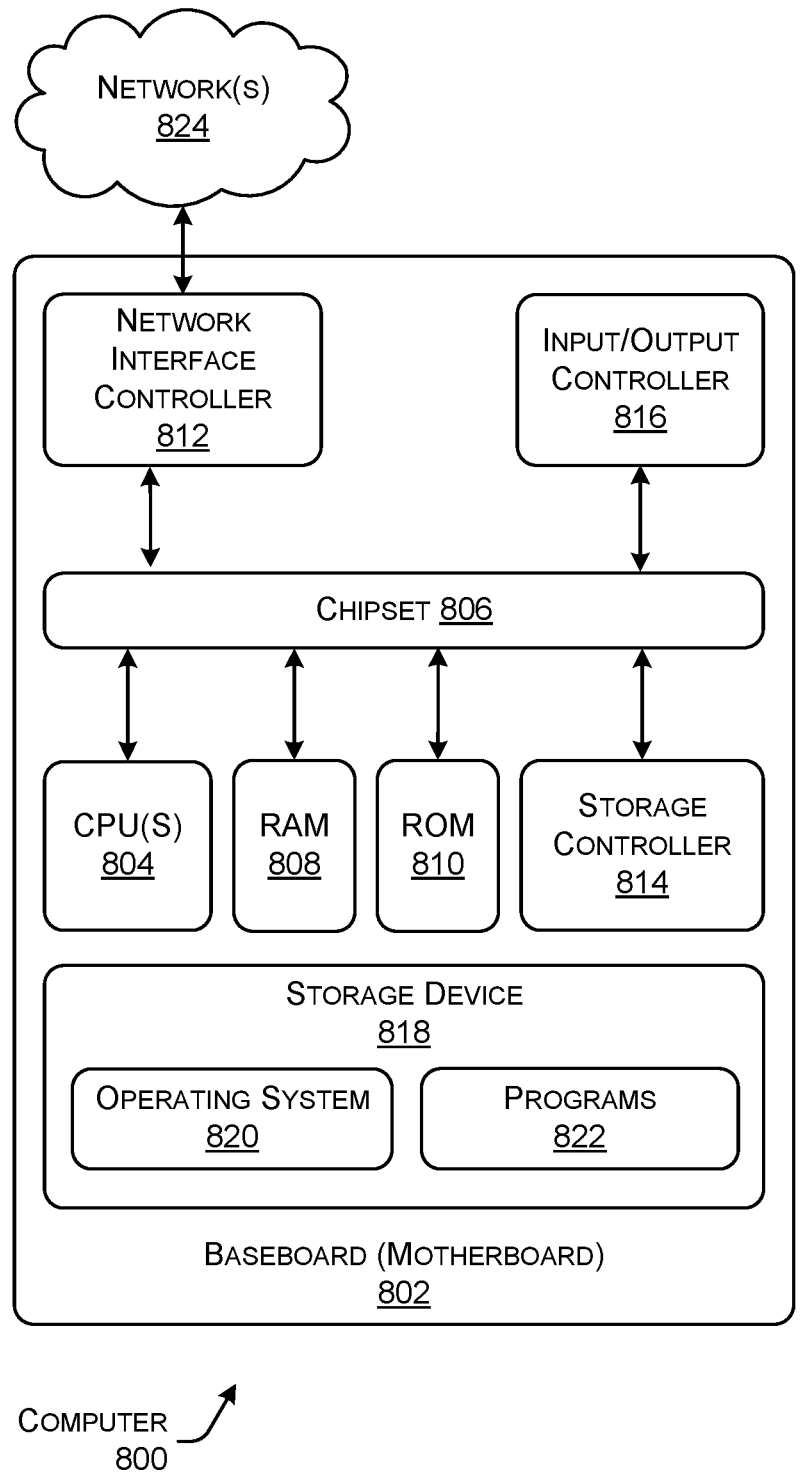
FIG. 8 is a computer architecture diagram showing an illustrative computer hardware architecture for implementing a computing device that can be utilized to implement aspects of the various technologies presented herein.

FIG. 8 shows an example computer architecture 800 for a computer such as the server computer 702 capable of executing program components for implementing the functionality described above. The computer architecture 800 shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a physical server 108 described herein above, and may comprise networked devices such as servers, switches, routers, hubs, bridges, gateways, modems, repeaters, access points, etc. such as network switches 108, 114, 120, or 204 described above with reference to FIGS. 1-2. In some examples, the computer 800 may be implemented in deduplication agent 128 (FIGS. 1-3) or deduplication agent circuitry 402 (FIG. 4). In one embodiment, the computer 800 may be implemented in logic or circuitry 500 (FIG. 5). The computer 800 may also be utilized in the implementation of method 600 (FIGS. 6A-6B).

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network 824, such as the network 708 of FIG. 7 or networks 102, 104, or 202 of FIGS. 1-2. The chipset 806 can include functionality for providing network connectivity through a Network Interface Controller (NIC) 812, such as a gigabit Ethernet adapter. The NIC 812 is capable of connecting the computer 800 to other computing devices over the network 708 (and/or 102, 104, or 202). It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the distributed application architecture 100, and or any components included therein, may be supported by one or more devices similar to computer 702. Stated otherwise, some or all of the operations performed by the distributed application architecture 102, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system.

According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the router 110, load balancer 112 and/or server 114. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure. The programs 822 may comprise any type of program that cause the computer 800 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting duplicate data flows in a data flow broker network, the method comprising:
   receiving by a computer network device a first data packet having a first five tuple, a first ingress interface, and first Virtual Large Area Network (VLAN) tag;
   installing an entry into a hardware-based policy tile database, the entry including the first five tuple, the first ingress interface, and the first VLAN tag;
   receiving by the computer network device a second data packet having a second five tuple, a second ingress interface, and a second VLAN tag;
   applying a first comparison operation of comparing the first five tuple with the second five tuple, the first ingress interface with the second ingress interface, and the first VLAN tag with the second VLAN tag;
   in response to a compatible result from the first comparison operation of the first five tuple matching the second five tuple, the first ingress interface matching the second ingress interface, and the first VLAN tag matching the second VLAN tag, then causing rerouting of the second data packet to a data flow analyzer;
   in response to an incompatible result from the first comparison operation, applying a second comparison operation to determine whether the first five tuple match the second five tuple and either the first and second ingress interfaces or the first and second VLAN tags is not matching one another, for determining dropping of the second data packet; and
   resetting a policy tile entry after at least one iteration to determine whether at least to drop a data packet.

2. The method as in claim 1, wherein the entry is installed into hardware-based database by a central processing unit.

3. The method as in claim 1, wherein the hardware-based database is stored in an Application Specific Integrated Circuit.

4. The method as in claim 1, wherein the first data packet is received by computer hardware and then sent to a computer processor where it is analyzed to determine a first data flow and generate one or more policy tiles to be sent to the hardware-based policy tile database which resides in the computer hardware.

5. The method as in claim 1, further comprising sending data regarding the first data packet to a central processing unit which performs operations to determine a first data flow based on the first five tuple and which generates the entry into the hardware-based policy tile database.

6. The method as in claim 1, further comprising: if the second ingress interface does not match the first ingress interface, determining the second packet to be a duplicate flow and dropping the second data packet.

7. A routing device comprising:
   one or more processors; and
   one or more non-transitory computer-readable media storing computer-executable instructions that, when executed by the one or more processors, cause the one or more processors to perform operations comprising:
   receiving by a computer network device a first data packet having a first 5 tuple, a first ingress interface, and first Virtual Large Area Network (VLAN) tag;

installing an entry into a hardware-based policy tile database, the entry including the first five tuple, the first ingress interface, and the first VLAN tag;

receiving a second data packet having a second five tuple, a second ingress interface and a second VLAN tag;

applying a first comparison operation of comparing the first five tuple with the second five tuple, the first ingress interface with the second ingress interface, and the first VLAN tag with the second VLAN tag;

in response to a compatible result from the first comparison operation of the first five tuple matching the second five tuple, the first ingress interface matching the second ingress interface, and the first VLAN tag matching the second VLAN tag, then causing rerouting of the second data packet to a flow analyzer;

in response to an incompatible result from the first comparison operation, applying a second comparison operation to determine whether the first five tuple match the second five tuple and either the first and second ingress interfaces, or the first and second VLAN tags is not matching one another, for determining dropping of the second data packet; and resetting a policy tile entry after at least one iteration to determine whether at least to drop a data packet.

8. The routing device of claim 7, wherein the entry is installed into hardware-based database by a central processing unit.

9. The routing device of claim 7, wherein the hardware-based database is stored in an Application Specific Integrated Circuit.

10. The routing device of claim 7, wherein the first data packet is received by computer hardware and then sent to a computer processor where it is analyzed to determine a first data flow and generate one or more policy tiles to be sent to the hardware-based policy tile database which resides in the computer hardware.

11. The routing device of claim 7, further comprising: resetting an entry to the policy tile database after either rerouting or dropping the second data packet.

12. The routing device of claim 7, further comprising sending data regarding the first data packet to a central processing unit which performs operations to determine a first data flow based on the first five tuple and which generates the entry into the hardware-based policy tile database.

13. The routing device of claim 7, further comprising: if the second ingress interface does not match the first ingress interface, determining the second packet to be a duplicate flow and dropping the second data packet.

14. One or more non-transitory computer-readable media storing computer-executable instructions that, when executed by one or more processors, cause the one or more processors to perform operations comprising:

receiving by a computer network device a first data packet having a first 5 tuple, a first ingress interface, and first Virtual Large Area Network (VLAN) tag;

installing an entry into a hardware-based policy tile database, the entry including the first five tuple, the first ingress interface, and the first VLAN tag;

receiving a second data packet having a second five tuple, a second ingress interface and a second VLAN tag;

applying a first comparison operation of comparing the first five tuple with the second five tuple, the first ingress interface with the second ingress interface, and the first VLAN tag with the second VLAN tag;

in response to a compatible result from the first comparison operation of the first five tuple matching the second five tuple, the first ingress interface matching the second ingress interface, and the first VLAN tag matching the second VLAN tag, then causing rerouting of the second data packet to a flow analyzer;

in response to an incompatible result from the first comparison operation, applying a second comparison operation to determine whether the first five tuple match the second five tuple and either the first and second ingress interfaces, or the first and second VLAN tags is not matching one another, for determining dropping of the second data packet; and resetting a policy tile entry after at least one iteration to determine whether at least to drop a data packet.

15. The one or more non-transitory computer-readable media of claim 14, wherein the entry is installed into hardware-based database by a central processing unit.

16. The one or more non-transitory computer-readable media of claim 14, wherein the hardware-based database is stored in an Application Specific Integrated Circuit.

17. The one or more non-transitory computer-readable media of claim 14, wherein the first data packet is received by computer hardware and then sent to a computer processor where it is analyzed to determine a first data flow and generate one or more policy tiles to be sent to the hardware-based policy tile database which resides in the computer hardware.

18. The one or more non-transitory computer-readable media of claim 14, the operations further comprising: resetting an entry to the policy tile database after either rerouting or dropping the second data packet.

19. The one or more non-transitory computer-readable media of claim 14, the operations further comprising: sending data regarding the first data packet to a central processing unit which performs operations to determine a first data flow based on the first five tuple and which generates the entry into the hardware-based policy tile database.

* * * * *